Nov. 4, 1924.
G. C. THOMAS, JR
1,514,408
CABLE CONNECTER
Filed Jan. 22, 1924
2 Sheets-Sheet 1
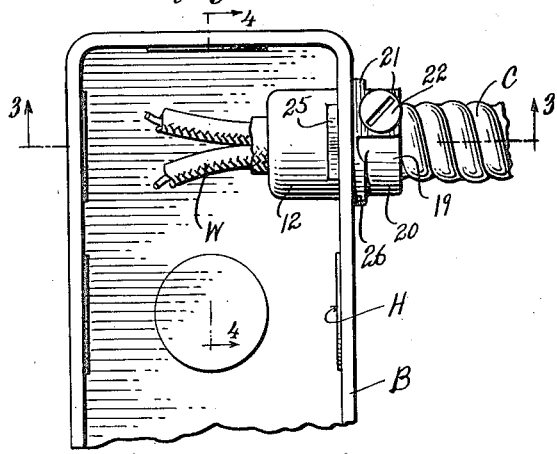
Fig.1.
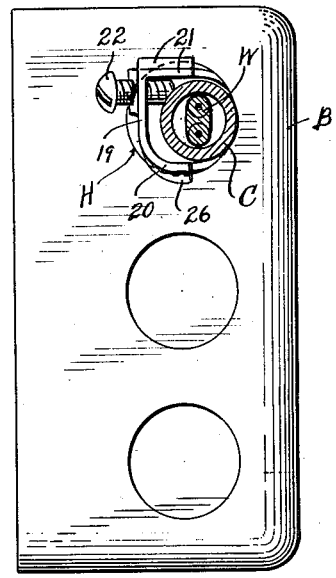
Fig.2.
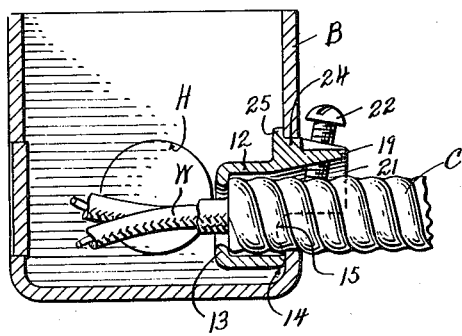
Fig.3.
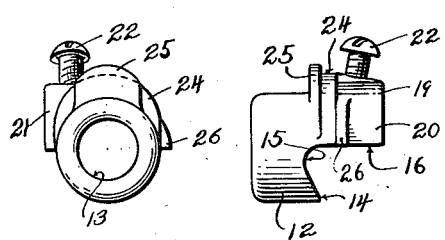
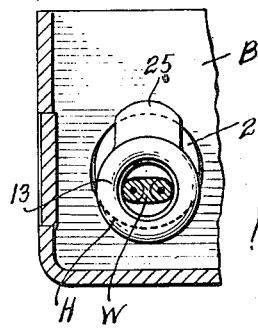
Fig.4.
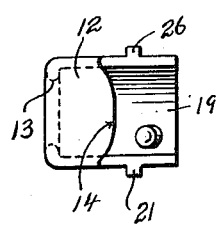
Fig.5.
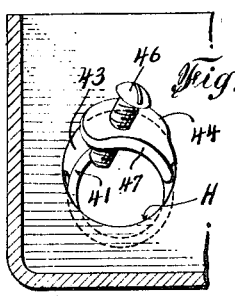
Fig.6. Fig.7.
INVENTOR
George C. Thomas, Jr.
BY
Holbert Ledbetter
ATTORNEYS

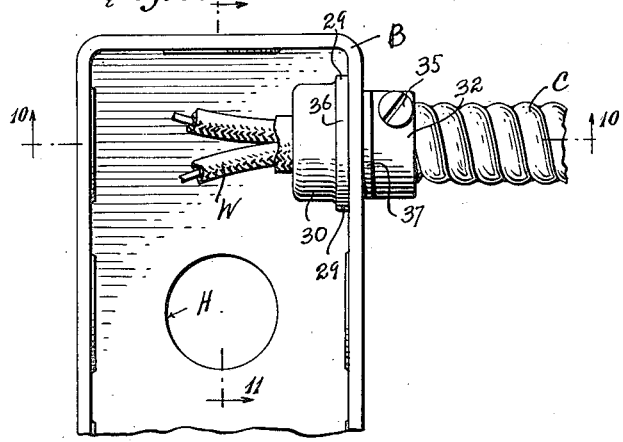
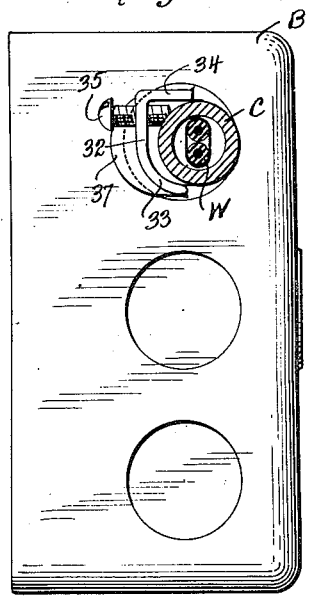
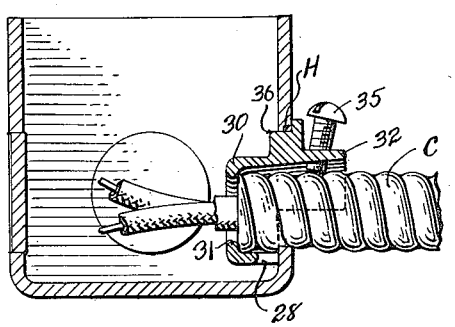
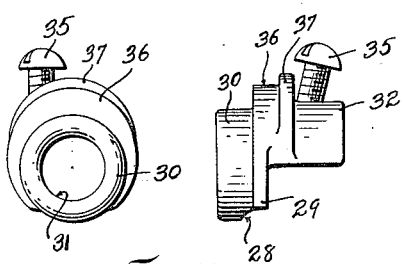
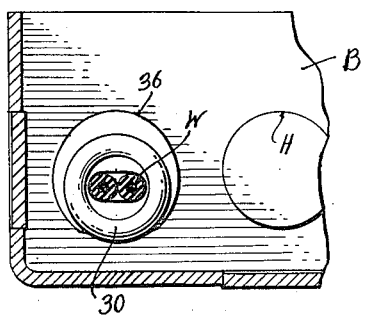

Patented Nov. 4, 1924.

1,514,408

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,785.

*To all whom it may concern:*

Be it known that I, GEORGE C. THOMAS, Jr., a citizen of the United States, residing at Elizabeth, in the county of Union and State of New Jersey, have invented certain new and useful Improvements in Cable Connecters, of which the following is a specification.

This invention relates to cable connecters for use in joining cables to electric box fixtures such as outlet boxes, cable boxes, switch boxes and others.

An object of the invention is to produce an improved cable connecter of simple and preferably one piece structure which is capable of being manufactured at low cost, which contains little material, and which positively anchors a cable to standard round knock-out holes in the usual run of electric fixture boxes.

An important feature of the invention resides in the composite sleeve structure of this improved connecter, part of which passes through the box knock-out hole exposing a portion of the said box knock-out edge or rim to pinch against the cable and concealing or covering over the remaining portion of the box hole edge or rim, the object being to utilize the exposed portion of the box knock-out edge to grip the cable, and use the concealed portion to grip the connecter, and thereby establish direct contact between the cable and the box.

An additional feature and object of this improved connecter resides in its capacity to establish good electrical contact between the armored cable and the outlet box, and this is brought about by reason of the fact that the cable is frictionally rubbed, pressed and squeezed against the exposed portion of the hole in the box to which the cable is attached; and such frictional pressure is brought about by operation of the connecter when the same is assembled and tightened up in the box by the mechanic doing the work.

The accompanying drawings illustrate preferred forms of the invention, the construction of which may be suitably varied or modified to meet the manufacturer's and user's requirements without departing from the scope and principle of my invention; and particularly the means for fastening the connecter to a box, such as ribs and the like, may be changed in structure or omitted in parts to lower the production cost thereof.

Figure 1 illustrates a top open view of the cable connecter shown assembled with an outlet box and cable; and Figure 2 shows a side projection thereof.

Figure 3 shows a sectional view taken on the line 3—3; and Figure 4 illustrates an inside end elevation of the assembled connecter with box and cable, the views being taken on the section line 4—4 of Figure 1.

Figure 5 illustrates a cluster view of the connecter removed from the box and cable showing a rear, side, and bottom projection thereof.

Figures 6 and 7 represent my invention reduced to its simplest form showing a thoroughly dependable connecter, in vertical longitudinal section and inside elevation, placed in a box with the cable removed to portray the characteristic shape of the single part and how it attaches to a round knock-out box hole without employing expensive sleeve threads and lock nut means.

The remaining figures of the drawing as illustrated on sheet 2 show a modified form of the cable connecter.

Figure 8 illustrates a top open view of the cable connecter shown assembled with an outlet box and cable; and Figure 9 shows a side view thereof.

Figure 10 illustrates a cross-sectional view taken on the line 10—10; and Figure 11 illustrates a side end elevation of the assembled parts, said view being taken on the sectional line 11—11.

Figure 12 illustrates a cluster view of the connecter removed from the box and cable showing an end, side, and bottom elevation thereof.

Referring further to the drawings for a more detailed description of the invention and with further reference to the purposes of the invention, it is understood by those conversant with the art that the ordinary electric fixture or outlet box B is made with knock-out holes or openings H which are left intact and covered by a partly punched disc, the said disc being knocked out at the time the cable is to be inserted. The cable C carrying wires W is adapted to be held in the box knock-out H by the improved cable connecter comprising the subject of this invention both as respects its detailed structure as well as its structure in combination with an electric fixture box and knock-out opening thereof.

Having particular reference to the connecter structure itself as shown in Figure 5, there is illustrated a connecter sleeve 12 having a bushing 13 in the nature of an internal shoulder through which wires W are passed and protected as to the insulation thereof while electrical connections are being made in the box B. The cylindrical portion 12 is substantially short and may terminate in a semi-circumferential bearing nose 14 which extends substantially one-half way round the sleeve 12 and runs at an angle to the connecter axis in the form of a spiral and terminates in an undercut 15 which merges with a horizontal edge 16 forming the side extremities of a lug 19—20—21, the said lug being integrally formed with the cylindrical sleeve part 12. The said bearing nose 14 is formed on a double curve which runs substantially one-half way around the circumference of the sleeve 12 and likewise slopes forwardly towards the bushing 13 thereby forming the undercut opening 15 as shown. When the connecter is viewed from the side, the characteristic sleeve structure presents the form of a hook and this design of the sleeve enables it to be inserted at an angle and hooked through the box knock-out opening H thereby enabling the part to be inserted through the box from the outside thereof despite the fact that its overall size appears larger than would be admitted through the hole of the box.

As above explained, the lug 19 is integral with the cylindrical part 12 and projects through the knock-out box hole H thereby covering or concealing substantially one-half portion of the rim of said opening while that portion of the rim H which is exposed lies eccentrically along and adjacent to the bearing nose 14. The lug 19 itself may possess a characteristic design in that the lug is provided with a flat top wall 19 which joins with a curved wall 20. The flat wall 19 is integral with a square shoulder vertical rib and wall 21 having a straight surface for the purpose of permitting a pressure or clamp screw 22 to be disposed in close relation to the said rib and wall 21. This composite wall structure 19—20—21 constitutes a projecting lug with downwardly directed side cable retaining walls 20 and 21 serving to brace the cable against side motion; and the wall is made comparatively thin enabling the said lug to be projected through the box knock-out H and at the same time affords or leaves sufficient room for the cable C to pass all the way through the said box knock-out.

The lug 19 and sleeve 12 are provided with shouldering means which overlap both the inside and outside edges of the said knock-out when the screw 22 is tightened down on the cable for simultaneously anchoring the connecter in the box wall and the cable in the connecter; and the said shouldering means is combined with a raised semi-circumferential bearing disc, rib or sector 24, and this projection 24 is in the nature of a bearing face, the lower ends of which are tangent to the circle defining the sleeve wall 12. The circumference of the semi-disc or raised arcuate part or sector 24 is disposed eccentrically to the circumference of the sleeve 12 and is adapted to fit against the internal circumference or rim of the knock-out H, and thus the said sleeve 12 is held eccentrically to the axis of the box hole H causing substantially one-half of the box hole edge to lie within the inner circumference of the cable sleeve 12 which presents this exposed sharp box edge H to the corrugated cable wall as observed in Figure 3. An inside rib shoulder 25 is integrally formed on the raised sector 24, and a pair of outside spaced rib shoulders 26 and 21 are made on the lug 19 and project from the raised part 24. The two outer ribs 21 and 26 are in circumferential alignment or in the same plane and have their faces abutting or bearing against the box wall B when the parts are assembled. The single rib 25 is spaced longitudinally forward of the ribs 26 and 21 and central thereof just far enough away from the ribs to equal the thickness of the outlet box wall and admit it thereinbetween. It is observed therefore, how the companion ribs 25, 21 and 26 prevent the connecter from moving or slipping longitudinally relatively to the box hole H. Furthermore, the raised disc 24 being eccentric to the axis of the sleeve 12 causes the sleeve to drop-down below the edge of the knock-out box hole H as already described and establishes the eccentric relation of the box hole and connecter sleeve.

In assembling the parts, a connecter, preferably without the cable being inserted therein, is inserted from the outside of the box by hooking the nose 14 of the sleeve 12 around the box with the rib 25 on the inside which places the sleeve inside the box with the sleeve end arranged eccentric over the box hole H, whereupon the cable C is inserted therein and by lifting upwardly on the connecter until the bearing face 24 rests snugly against the inner rim of the knock-out H which causes the lugs 25 and 26 to embrace the opposite box wall surfaces. The screw 22 is now tightened down against the cable C, the direction of the screw being such that it preferably engages the cable at substantially a tangent thereby avoiding crushing the cable. The pressure of the screw 22 against the wall of the cable embeds the corrugated armored wall thereof into the eccentrically exposed inner box edge of the hole H serving to burr or pinch the cable into the said box edge thereby firmly fixing the cable to the box. At the same time the pressure of the screw bearing on the cable causes the connecter to be forcibly lifted upwardly away from the cable thereby holding the lugs or ribs 25 and 26 in overlapping bearing relation with the inside and outside surfaces of the box wall.

A simple and positively acting connecter characteristic of the principles just described is further illustrated in Figures 6 and 7; and here is shown a similar connecter sleeve 40 having a cut-away sleeve end 41 overhanging the box wall B through the knock-out hole H; and a sleeve nose 42 rests against the box wall below or outside the circumference line of the knock-out H which brings said hole edge H eccentrically inside the circumference line of the sleeve 40. In order that the offset, staggered, or eccentric relation of the nose 42 and hole edge H be maintained, the sleeve carries an integral semi-circular raised boss or bearing sector 43 with comparatively short marginal ribs 44 raised above the bearing element 43 and flanking each side of the box wall B serving to fix the connecter against longitudinal movement when a cable is inserted and the screw 46 is tightened down against it. Though the deep undercut 41 aids in quickly hooking the connecter through the box hole H, the end of the sleeve may as well be made straight at the box abutting end if desired.

The raised boss or disc, which tightly fits against the internal rim of the box hole, tapers down to meet the inside straight wall of the sleeve projection 47 and thus provides a circular lug wall serving to support the cable when pressed by a clamp screw; and this lug is drilled and tapped to carry the screw 46 preferably at a double angle so the inner end thereof bears on the cable closely over the hole edge H and substantially in the same plane therewith as well as bear tangentially against the cable. The sleeve undercut 41 runs deep and well around the sleeve 40 in order that a major part of the hole edge H be exposed to the cable. In this way the cable is gripped by the box hole not at one point but over a larger area thereof which prevents crushing of the cable yet at the same time allows positive clamping thereof. The connecter is convenient to insert because of the small size thereof and is inexpensive to produce.

A description of the modified form of the invention will now be given and reference is made to sheet 2.

A connecter sleeve 30 is made with a cable bushing 31. The rear end of the short cylindrical sleeve 30 is made with short shoulder faces or ribs 29 which are in fact the end surface of the sleeve 30 as divided into the two faces or ribs 29 by the deep undercut 28. A flat lug wall 32 is integral with the sleeve 30. The lug wall 32 is formed compositely with a side curved wall 33 and another straight wall 32 and 34. A clamp screw 35 is carried in the lug and disposed in parallel relation to the straight wall 34, the arrangement being such that the said screw 35 bears substantially at a tangent against the armored cable wall C.

A raised bearing face or sector 36 partly encircles the sleeve 30 on the rear end thereof terminating in the aforesaid ribs 29 on the bottom side of the connecter, and this broad faced bearing disc 36 fits against the knock-out box opening H. A comparatively short outer rib shoulder arc 37 is integrally formed with the raised disc 36 and projecting part 32 and rises above the circumference of the bearing disc 36 which serves to prevent the connecter from slipping back into the box, and the end faces or ribs 29 prevent it from slipping out of the box. It is pointed out that the circumference of the bearing disc 36 is disposed eccentrically to the circumference of the sleeve 30 and thus when the part 36 bears against the box hole H, it follows that the said sleeve 30 is positioned eccentrically to the hole H thereby causing the box opening edge to lie on the inside of the sleeve 30 part of the way therearound.

In assembling the parts, this connecter is preferably inserted from the inside of the box by projecting the lug 32 through the box hole. The shoulder 37 readily passes through the box hole whereupon the connecter is seated against one-half of the box hole rim by bringing the raised portion 36 against the hole edge. Thus we have the connecter inserted inside the box opening concealing or covering part of the hole edge H and exposing the other portion thereof eccentrically within the circumference of the sleeve 30. The cable C is inserted in the sleeve with the wires W drawn through the bushing 31, and the cable wall rests on the exposed sharp box edge. The screw 35 is now set up tightly against the cable which pinches or embeds the cable C into the box hole edge H thereby steadfastly anchoring the cable to the box. As the screw drives down on the cable, the connecter bears tightly upwardly against the edge of the box hole with the shoulder 37 abutting the outside of the box wall and the shoulders 29 abutting the inside box wall. Thus the connecter is fixed against longitudinal movement. The connecter fits so tightly in the box hole H and the broad face 36 so tightly bears against the box hole that the cable and connecter are restrained against wobbling or sidewise motion and no looseness of parts may occur.

It is observed how the general overall shape and design of the connecter provides a combined or composite cylindrical part with the projecting half around cylindrical portion which leaves a corner gap extending deep into the part thereby exposing the already described nose or end shoulder face extending part way around the sleeve; and the box rib or ribs are made substantially opposite the end face or nose, the said box ribs and sleeve face cooperating in slightly offset relation to provide means for firmly fixing the connecter to a box.

What I claim is:—

1. Improvements in combination cable connecters and fixture boxes comprising a box with a connecter and cable receiving hole, a lug projecting through the hole and disposed alongside the cable, a sleeve inside the box integral with the lug, said sleeve having half its circumference disposed eccentrically with reference to the box hole thereby bringing part of the hole rim eccentrically within the sleeve, means made on the lug bearing against and concealing the other part of the hole rim maintaining the aforesaid eccentricity of parts, abutments carried on the means by which the connecter is fixed against slippage, and cable clamping means carried by the lug by which the cable is pinched into the eccentric rim of the hole and by which the aforesaid means is forced to bear against the rim of the hole thereby establishing direct electrical contact between the box and cable.

2. In combination, an electric fixture box having openings therein to receive a connecter and cable, a connecter comprising a sleeve held in the box over the opening with a portion of the sleeve end edge disposed eccentrically with reference to the edge of the opening, a member integral with the sleeve projecting through the box opening alongside the cable, a raised bearing face made eccentrically on the connecter and abutting a portion of the rim of the box opening thereby positioning the sleeve axis eccentrically as aforesaid to the axis of the box opening, a screw carried by the connecter pressing the cable against the edge of the box opening and forcing the rib into close engagement with the said rim, and means carried by the connecter overlapping the edge of the box opening inside and outside the box to prevent longitudinal slippage of the connecter.

3. In combination, an electric fixture box having openings therein to receive a connecter and cable, a connecter comprising a sleeve held in the box over the opening with a portion of the sleeve end edge disposed eccentrically with reference to the edge of the opening, a member integral with the sleeve projecting through the box opening alongside the cable, a raised bearing face made eccentrically on the connecter and abutting a portion of the rim of the box opening thereby positioning the sleeve axis eccentrically to the axis of the box opening, a cable clamping means carried by the connecter pressing the cable against the edge of the box opening and forcing the rib into close engagement with the said rim, and ribs raised on the connecter spaced apart to permit the box wall to repose therebetween and hold the connecter against movement relatively to the box.

4. In combination, an electric fixture box having openings therein to receive a connecter and cable, a connecter comprising a sleeve held in the box over the opening with a portion of the sleeve end edge disposed eccentrically with reference to the edge of the opening, a member integral with the sleeve projecting through the box opening alongside the cable, a raised bearing face made eccentrically on the connecter and abutting a portion of the rim of the box opening thereby positioning the sleeve axis eccentrically to the axis of the box opening, a screw carried by the connecter and bearing on the cable pressing said cable into the box edge, and ribs raised on the connecter spaced apart to permit the box wall to repose therebetween and hold the connecter against movement relatively to the box.

5. In combination, an electric fixture box having openings therein to receive a connecter and cable, a connecter comprising a sleeve held in the box over the opening with a portion of the sleeve end edge disposed eccentrically with reference to the edge of the opening, a member integral with the sleeve projecting through the box opening alongside the cable and said member covering over part of the rim opening and leaving exposed the remaining rim portion, said exposed box opening rim being eccentrically disposed inside the sleeve and at the end thereof, the aforesaid cable lying in contact with the eccentric exposed rim, means carried by the connecter overlapping the box opening edge to prevent slippage of the connecter; a screw carried by the connecter pressing the cable against the eccentric part of the rim and pressing the member against the concealed part of the rim.

6. In combination, an electric fixture box having openings in the wall thereof for the reception of a cable and a connecter, a connecter comprising a sleeve with one end abutting the inner wall of the box adjacent the rim of the opening and so arranged that the rim or edge of the box opening is eccentrically exposed or curved into the circumference of the said abutting connecter sleeve, a lug integral with the sleeve extending through the box opening and concealing that part of the box opening edge or rim opposite the aforesaid exposed eccentric rim, a bearing face raised eccentrically on the surface of the lug and bearing tightly against the concealed box opening edge thereby maintaining the aforesaid eccentricity of the sleeve in relation to the exposed box opening edge, a rib raised above the circumference of the bearing face engaging the box wall holding the connecter against longitudinal movement in relation to the box, and a clamping device carried by the lug to fix the cable in the connecter as well as jam the cable against the exposed box opening edge.

7. In combination, an electric fixture box with openings in the wall thereof for cable connections, a connecting device inserted through the box wall opening, a sleeve integral with one end of the device and disposed on one side of the box wall over the opening, a cable clamping means carried by the other end of the device and disposed on the other side of the box wall opposite the sleeve, a bearing face raised on the device and bearing against a portion of the inside rim of the opening thereby displacing said sleeve eccentrically with respect to the axis of the opening and bringing part of the rim within the circumference of the sleeve, a rib raised on the bearing face inside the box, a rib raised on the bearing face outside the box, the said ribs being spaced apart a distance about equal the thickness of the box wall and acting to anchor the said sleeve and device against longitudinal motion relatively to the box and said clamping means acting to force the bearing face against the box hole edge and the cable against the box hole edge.

8. In combination, an electric fixture box with openings in the wall thereof for cable connections, a sleeve connecting device inserted through the box wall opening, said sleeve provided with a semi-circumferential bearing face abutting the box wall and overlapping half the circumference of the rim of the box opening which disposes said half of the rim opening eccentrically inside the sleeve, a lug integral with the sleeve projecting through the box wall opening, a bearing face integral with the lug and raised therefrom and contacting the inner rim edge of the box wall opening thereby holding said sleeve concentrically with respect to the axis of the opening and bringing part of the box wall edge opening within the circumference of the sleeve as aforesaid, a rib on the bearing face overlapping the box opening rim to fasten the connecter in the box, a straight side wall integral with the sleeve forming part of the projecting lug, a curved wall also forming part of the lug and acting as a side cable rest, and a cable clamping means carried by the lug and bearing on the cable pressing the cable into the exposed rim of the box opening and pressing the bearing face against the other portion of the rim of said opening.

9. A cable connecter to anchor cable to a box, comprising a sleeve of composite full cylindrical form and half-cylindrical form projecting from the said cylinder, the said full cylinder acting as a cable retaining sleeve, one end of the cylinder made with a semi-circumferential bearing face extending to the edges of the half-cylindrical part, the said half-cylindrical part being provided with shoulders cooperating with the aforesaid bearing face to provide connecter box fastening means holding the sleeve against longitudinal motion, and means carried by the projecting part for engagement with a cable which renders effective the aforesaid box fastening means.

10. A cable connecter to anchor cable to a box, comprising a sleeve of integral composite full cylindrical form, and half-cylindrical form, the said full cylinder acting as a cable retaining sleeve, one end of the sleeve made with a semi-circumferential abutment extending to the edges of the half-cylindrical part, a shoulder made on the half-cylindrical part and cooperating with the aforesaid bearing face to provide connecter box fastening means, and a screw carried by the projecting part to engage a cable.

11. A cable connecter to anchor cable to a box, comprising a cylindrical sleeve to receive a cable end, a projecting part integral therewith and forming a continuation of the said sleeve, a cable clamping screw extending through the projecting part and adapted to bear against a cable, means carried by the connecter adapted to overlap the edges of a box hole to hold the connecter against longitudinal movement, and means on the connecter adapted to rest against the circular rim of a box hole to hold the aforesaid sleeve eccentric to the box hole and cause the cable to bear against a portion of the box hole rim.

12. A cable connecter to anchor cable to a box, comprising a combined sleeve and projecting part integral therewith, said sleeve made cylindrical in form to receive a cable, a bushing at one end of the sleeve, said projecting part forming a continuation of the sleeve and having an undercut at the juncture of the sleeve and projection, an arcuate bearing nose formed on the sleeve, a cable clamp screw extending through the projecting part, and ribs carried by the connecter to engage a box wall.

13. A cable connecter to anchor cable to a box, comprising a combined sleeve and projecting part integral therewith, said sleeve made cylindrical in form to receive a cable, a bushing at one end of the sleeve, said projecting part forming a continuation of the sleeve, an arcuate bearing nose formed on the sleeve end, a cable clamp screw extending through the projecting part, ribs carried by the connecter, and a raised bearing face integral with the connecter and disposed in eccentric relation to the arcuate bearing nose.

14. A cable connecter to anchor cable to a box, comprising a sleeve of composite cylindrical form and half-cylindrical form, the said parts being integrally joined end to end, the said cylinder acting as a cable retaining sleeve, one end of the sleeve being undercut to form a bearing nose extending to the edges of the half-cylindrical part, a shoulder made on the half-cylindrical part in opposite relation to the bearing nose and cooperating with the aforesaid bearing nose to provide connecter box fastening means, and means carried by the projecting part for engagement with a cable.

15. A cable connecter to anchor cable to a box, comprising a sleeve of composite cylindrical form and half-cylindrical from, the said parts being integrally joined end to end and the half-cylindrical part projecting from the sleeve in the form of a lug, the said cylinder acting as a cable retaining sleeve, one end of the sleeve being undercut to form a bearing nose, a raised eccentric bearing face made on the connecter in opposite relation to the bearing nose, box edge retaining ribs made on the bearing face and cooperating with the aforesaid bearing nose to provide connecter box fastening means, and means carried by the projecting lug for engagement with a cable.

16. A cable connecter to anchor cable to a box, comprising a sleeve of composite cylindrical form and half-cylindrical form, the said parts being integrally joined end to end and the half-cylindrical part projecting from the sleeve in the form of a lug, the said cylinder acting as a cable retaining sleeve, one end of the sleeve being undercut to form a bearing nose, a raised eccentric bearing face made on the connecter in opposite relation to the bearing nose, box edge retaining ribs made on the bearing face and cooperating with the aforesaid bearing nose to provide connecter box fastening means, and a screw extending through the projecting lug to engage a cable.

17. A cable connecter to anchor cable to a box and capable of being installed in a box from the outside thereof, comprising a sleeve to receive a cable, a lug integral with the sleeve and extending therefrom along a line parallel to the sleeve axis; a bearing face raised on the connecter adapted to rest against the rim of a box hole, a rib integral with the bearing face and projecting thereabove and disposed on one side of said bearing face, ribs integral with the other side of the bearing face projecting thereabove and adapting a box wall to rest between the first rib named and the second ribs named, and a screw extending thru the connecter to engage a cable.

In testimony whereof I affix my signature.

GEORGE C. THOMAS, Jr.